United States Patent [19]
Ueno et al.

[11] Patent Number: 4,821,385
[45] Date of Patent: Apr. 18, 1989

[54] METHOD OF MAKING A BEARING

[75] Inventors: Hiroshi Ueno; Tomoaki Satomi; Teruo Yoshida, all of Osaka, Japan

[73] Assignee: Koyo Seiko Co., Ltd., Osaka, Japan

[21] Appl. No.: 78,120

[22] Filed: Jul. 27, 1987

[30] Foreign Application Priority Data

Jul. 29, 1986 [JP] Japan .............. 61-117399[U]
Jun. 24, 1987 [JP] Japan .................. 62-156784

[51] Int. Cl.⁴ ............................................. B21D 53/10
[52] U.S. Cl. .......................... 29/148.4 A; 29/149.5 R; 384/492
[58] Field of Search .............. 29/148.4 A, 149.5 R, 29/724; 384/492, 625, 907.1

[56] References Cited

U.S. PATENT DOCUMENTS 3,781,958  1/1974  Parker ........................ 29/148.4 A
3,844,010 10/1974  Frost et al. ................. 29/148.4 A

FOREIGN PATENT DOCUMENTS 58-166128 10/1983 Japan .

Primary Examiner—Carl E. Hall
Assistant Examiner—Irene Cuda
Attorney, Agent, or Firm—Saidman, Sterne, Kessler & Goldstein

[57] ABSTRACT

A bearing comprising inner and outer rings formed of a metal and a plurality of balls formed of calcined carbon which has self-lubricating properties and hardness higher than that of the inner and outer rings and has been baked beforehand at a temperature higher than a working temperature of the bearing so as to prevent the outgassing even when used in the circumstances of high temperature.

4 Claims, 4 Drawing Sheets

Gas chromatogram obtained through the heating at 150°C (with a baking treatment)

time (mass number)

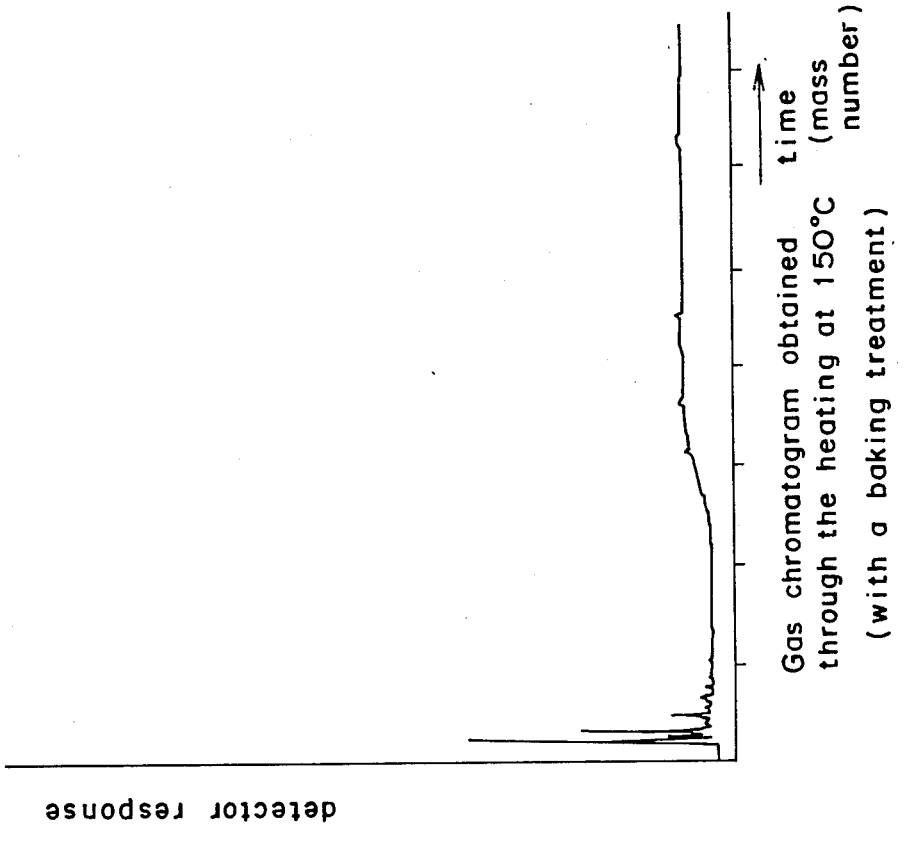
Fig. 7 Gas chromatogram obtained through the heating at 150°C (with a baking treatment)
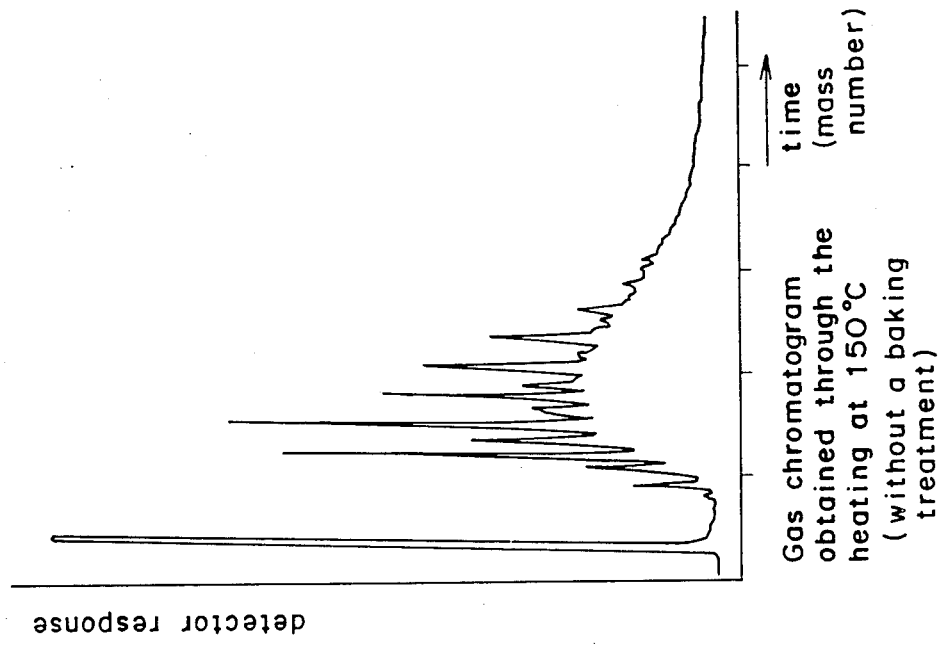
Fig. 5 Gas chromatogram obtained through the heating at 150°C (without a baking treatment)

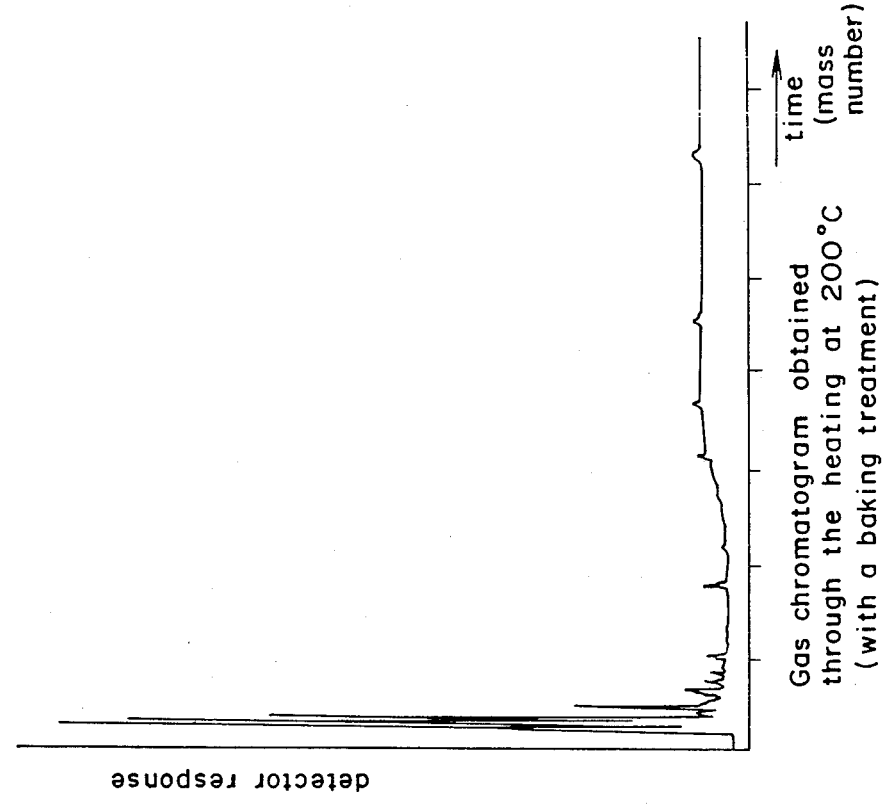
Fig. 8 Gas chromatogram obtained through the heating at 200°C (with a baking treatment)
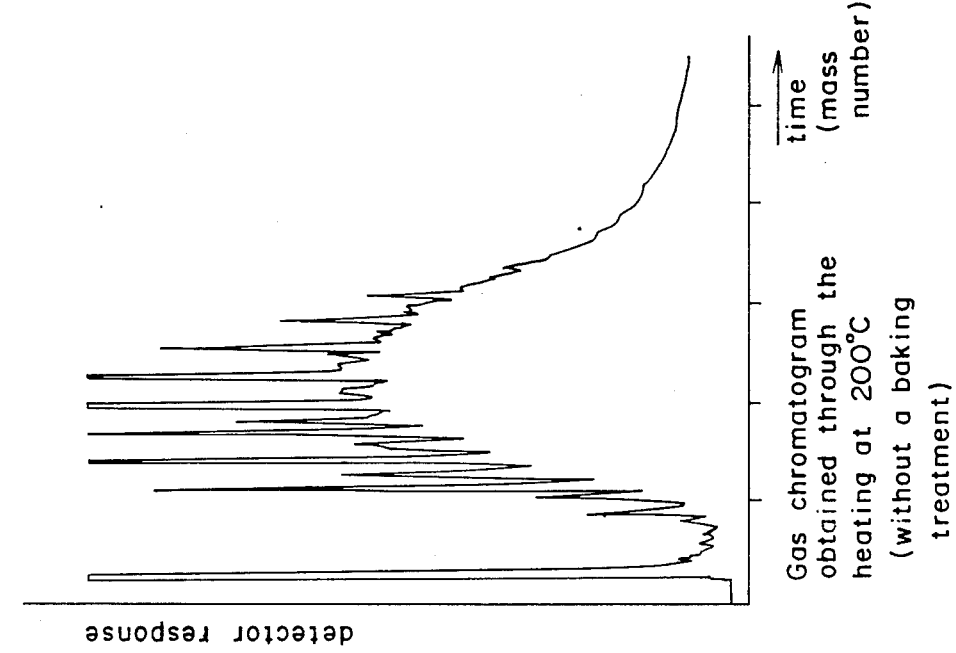
Fig. 6 Gas chromatogram obtained through the heating at 200°C (without a baking treatment)

METHOD OF MAKING A BEARING

BACKGROUND OF THE INVENTION

The present invention relates to bearings which are used in the fields requiring high cleanness of a working area, such as food processing industry, semiconductor manufacturing industry, or the like, and therefore are fed with no lubricant.

Bearings for which such lubricants as lubricating oil and grease can not be used require the use of solid lubricants in order to reduce the friction between inner and outer races and rolling elements.

Conventionally, a bearing as shown in FIG. 9 has been known as an example of such bearings. The bearing comprises an inner ring 1, an outer ring 2, a plurality of steel balls 3 (only one is shown), and a cage 5 for retaining the steel balls 3. The inner and outer rings 1 and 2 are formed of a metal having no self-lubricativity, and the cage 5 of a fluoroplastic having self-lubricativity. During the revolutions of the bearing, the fluoroplastic is transferred to the steel ball, and then the inner and outer rings 1 and 2 in sequence to form a fluoroplastic film over them, whereby a lubricating action being performed.

The bearing of such a combination of materials, however, has a drawback that the lubricating action between the steel balls 3 and the metal steel inner and outer rings 1 and 2, can not be well performed at the beginnings of revolutions since it takes time for the fluoroplastic of the cage 5 to transfer to the surface of the steel balls 3.

In addition to the above conventional example, another type of a bearing is known, as disclosed in the Japanese Patent Application Laid-open No. 51-110152. This bearing comprises inner and outer rings, a cage, balls all of which are made of the same material. This material is a sintered carbonaceous material made from the mixture of black lead, carbon black, coke, and the like of a appropriate mixture ratio, including, if necessary, carbon fibers, so that it has a self-lubricativity. Accordingly it is assured that the bearing of this type obtains high lubricating properties.

Hardness of the sintered carbonaceous material, however, is so low as shown by values 30 to 120 of Shore hardness (corresponding to 207 of Vickers hardness), and therefore, the bearing made of this material can not bear a high load.

SUMMARY OF THE INVENTION

A first object of the present invention is to provide a bearing having superior self-lubricating properties and a high load bearing ability at the same time.

A second object of the present invention is to provide a bearing which can perform the lubricating action without using any lubricants such as lubricating oil, grease and the like and does not cause outgassing even when used in an atmosphere of high temperature, and therefore, is suitable for the use in semiconductor wafer production units, for example.

In order to accomplish the first object, a bearing according to the present invention is characterized by comprising a couple of rings formed of a metal; a plurality of rolling elements formed of calcined carbon and provided with hardness higher than that of the rings; and a cage formed of a fluoroplastic for retaining the plurality of carbon rolling elements.

This bearing acts as follows: At the beginnings of the operation, the lubricating action is performed between the rolling elements and the couple of rings by the carbon of the rolling elements. In process of the revolutions of the bearing, the fluoroplastic of the cage is rubbed off by the rolling elements due to the contact of the cage and the rolling elements, and transfers onto the surface of them. In this way, a fluoroplastic film is formed on the substantially allover surface of each of the rolling elements. The fluoroplastic over the rolling elements further transfers to the respective races of the rings so as to coat them. This is how the lubricating action is performed well between the rings and the rolling elements.

In order to accomplish the second object, a bearing according to the present invention is characterized by comprising a couple of rings formed of a metal; a plurality of rolling elements formed of calcined carbon having hardness higher than that of the rings and baked beforehand at a specified temperature.

According to the above construction, a good lubricating action is performed between the couple of rings and the plurality of rolling elements due to the self-lubricating properties of the carbon forming the rolling elements. The rolling elements wear out so slowly, due to its hardness higher than that of the rings, that the bearing obtains longevity.

Application of a baking treatment at a preset temperature to the carbon rolling elements rids them of residual abrasive solutions used for abrading those elements, a green carbon component and so on through the evaporation. This prevents the outgassing even in the circumstances of high temperature.

BRIEF DESCRIPTION OF THE DRAWINGS

The above and other objects and features of the present invention will become apparent from the following description taken in conjunction with the preferred embodiments thereof with reference to the accompanying drawings, in which:

FIGS. 5 and 7 are gas chromatograms obtained when a bearing not baked is heated at 150° C. and another at 200° C., respectively;

FIGS. 6 and 8 are gas chromatograms obtained when a baked bearing is heated at 150° C and another at 200° C., respectively.

DETAILED DESCRIPTION OF THE PREFERRED EMBODIMENTS

Figure 1:
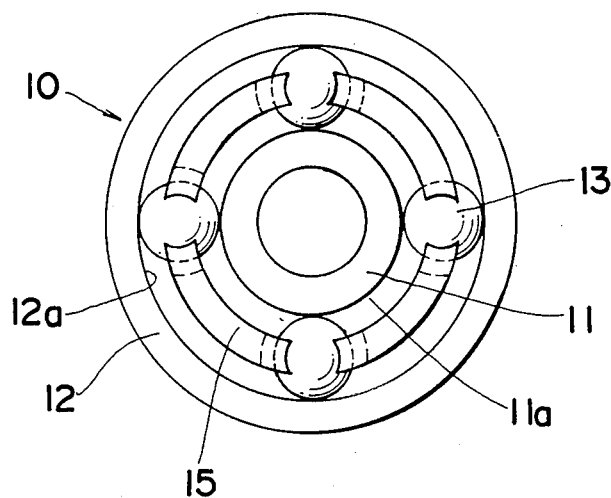
FIG. 1 is a front view of a ball bearing according to a first embodiment of this invention.

Before the description of the present invention proceeds, it is to be noted that like parts are designated by like reference numerals throughout the accompanying drawings.

Referring now to FIG. 1, this shows a front view of a ball bearing 10 as an example of the present invention, wherein reference numerals 11 and 12 designate an inner ring and an outer ring, reference numeral 13 designates balls as an example of the rolling elements which are arranged at regular intervals between the inner ring 11 and the outer ring 12 and move rotating on the axis of their own on races 11a and 12a of the respective inner and outer rings 11, 12, and reference numeral 15 designates a cage for retaining the balls 13.

experimental results are shown in the following Table 1.

TABLE 1

| | Combination of Materials | | | Experimental Results (500 rpm × 500 hours, load Fr = 10 Kg) | | | | | | | | | |
|---|---|---|---|---|---|---|---|---|---|---|---|---|---|
| | | | | Numerical Data | | | | | | Appearance | | | |
| | | | | Torque (Kg · cm) | | | Acceleration of Vibration (G) | | | Increase in Radial Gap (μm) | | | Races of Inner & Outer Rings |
| No. | Cage | Balls | Inner and outer rings | 200 rpm | 500 rpm | 1000 rpm | 200 rpm | 500 rpm | 1000 rpm | | Cage | Balls | |
| 1 | fluoro-plastic | carbon | metal SUS440C | 1.0 | 1.6 | 2.2 | 0.05 | 0.30 | 0.35 | 25 | good | good | good |
| 2 | fluoro-plastic | metal | metal SUS440C | 1.1 | 1.7 | 2.5 | 0.10 | 0.40 | 0.85 | 68 | somewhat worn out | dull | surface a little roughened |
| 3 | nylon | metal | metal SUS440C | 1.2 | 1.9 | 3.0 | 0.64 | 1.41 | 2.70 | 83 | greatly worn out | moderately worn out | surface greatly roughened |
| 4 | nylon | carbon | metal SUS440C | 1.1 | 1.8 | 2.7 | 0.19 | 0.45 | 0.92 | 50 | somewhat worn out | somewhat worn out | good |
| 5*[1] | metal | metal | metal SUS440C | | | | 5.0 and more | 5.0 and more | 5.0 and more | | guide face scratched | somewhat wornout & dull | surface greatly roughened |

*[1] No. 5 impossible of revolutions in a few hours

The inner and outer rings 11 and 12 are formed of a metal having no self-lubricating properties such as bearing steel, stainless steel, or the like. On the other hand, the balls 13 are formed substantially of calcined carbon having the self-lubricating properties and the cage 15 a fluoroplastic which also has similar properties. Some of the fluoroplastic of the cage 15 is to transfer onto the surface of balls 13 and then to the rings' races 11a and 12b during revolutions.

Vickers hardness (Hv) of the metal inner and outer rings 11 and 12 is 700 and that of the carbon balls 13 is 1700. As understood easily from these values, since both the inner and outer rings 11, 12 and the balls 13 have a sufficient strength and in addition, the balls 13 are harder than the inner and outer rings 11 and 12, the bearing 10 can bear high load. The hardness of the balls 13 and of the rings 11 and 12 are so adjusted that the relation between them may be as follows:

Hv (of balls) ≧ 1.5 Hv (of rings)

If the value of Hv of the balls does not satisfy the above equation, the balls 13 easily wear out. This is because the balls 13 are kept in contact with both the inner ring 11 and the outer ring 12 at the same time, compared with the inner and outer rings 11 and 12 in contact with only the balls 13, and therefore are always under loads acting them simultaneously in diametrical directions. In addition to this reason, there is a further reason that the balls 13 must bear high local contact pressure since they have a smaller curvature.

Figure 2:
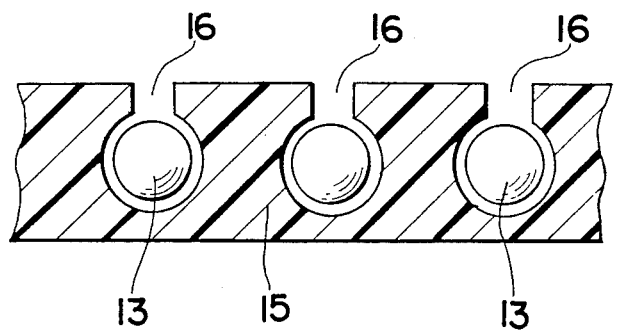
FIGS. 2 and 3 are schematic sectional views of different cages.

As FIG. 2 shows, the cage 15 has openings 16 on one side thereof at places for retaining the balls, so that its shape is like a crown. The openings 16 give the cage 14 flexibility to follow various movements of the balls 13 since the cage 15 does not restrain the balls 13 excessively. Accordingly, the cage always allows the balls 13 to rotate well and supplies each of them with a film of the fluoroplastic.

Figure 3:
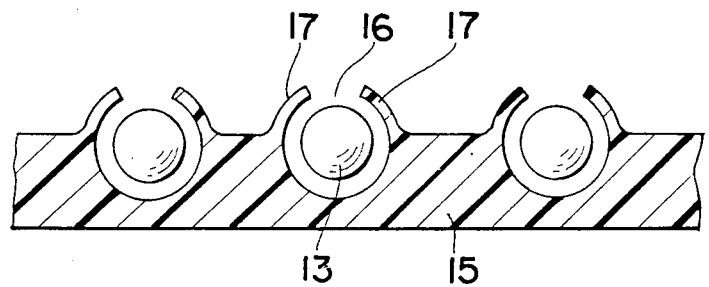

A modified cage shown in FIG. 3 is superior in elasticity and flexibility since each opening 16 thereof is defined by a couple of such curved projections 17, 17 as to enclose the ball 13.

The inventors experimented on revolutions of the bearing 10 (No. 1) of this embodiment and other sample bearings (No. 2 to No. 5) without using any lubricants and observed the appearance of those bearings. The experimental results are shown in the following Table 1.

As is obvious from the experimental results, the numerical data obtained has revealed that both torque and acceleration of vibration are small for the bearing (No. 1) according to this embodiment. The torque was 2.2 kg.cm and the acceleration of vibration was 0.35 G even under a high speed revolutionary condition of 1000 rpm. These values are the smallest of all. Increase in radial clearance between rings and a ball was 25 μm for the bearing of this embodiment and this value is also the smallest and far smaller than the largest value 83 μm of the sample bearing No. 3. The results on appearance were also satisfactory with all of the cage, balls, and inner and outer rings of No. 1.

On the other hand, the No. 5 case, in which the cage, balls, and inner and outer rings are all of metal which has no self-lubricating properties, resulted in the impossibility of revolution in a few hours because of the injury at contact portions, this fact indicating that bearings of such a combination of materials are not suitable for an actual use.

As for the No. 4 case, the second best results were obtained on both numerical data and appearance. This is maybe owing on the combination of materials similar to that of the No. 1 case of the present invention, except for the cage of nylon.

From the above observations, it is possible to conclude that the optimum constitutional combination is fluoroplastic of a cage, carbon of balls, and metal of inner and outer rings.

This embodiment is not limited to ball bearings, but is also applicable to roller bearings. Moreover, this embodiment can be applied not only to radial bearings but also to thrust bearings. In addition, a belt-shaped cage can be used in stead of the crown-shaped one.

As is obvious from the above description, since the bearing according to the present invention comprises a couple of metal rings; a plurality of carbon rolling elements provided with hardness higher than that of the rings; and a fluoroplastic cage for retaining the plurality of carbon rolling elements, a lubricating action is performed by the carbon of the rolling elements at the beginning of operation, and in process of the revolutions, the fluoroplastic of the case transfers onto the rolling elements and the rings in sequence, so that the lubricating action of the bearing is well performed, whereby wear-resisting properties of the bearing are improved very much. In addition to the good wear-resisting properties, the bearing according to the present invention is improved in strength and can bear high load since the rolling elements have hardness higher than that of the rings.

The following will refer to a second embodiment of the present invention.

Figure 4:
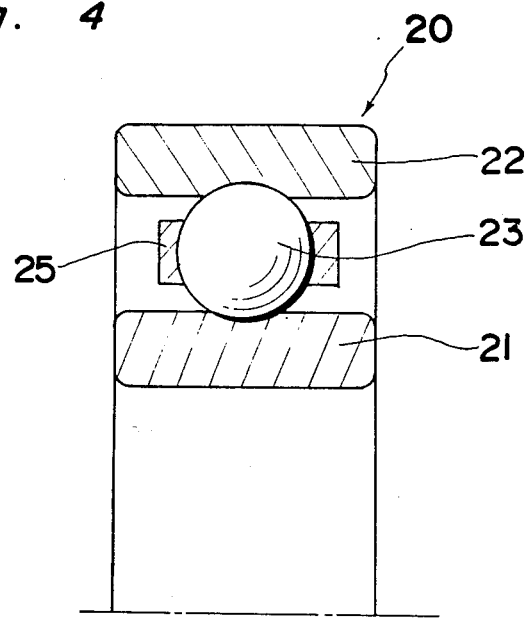
FIG. 4 is a sectional view of a bearing of a second embodiment.
Figure 9:
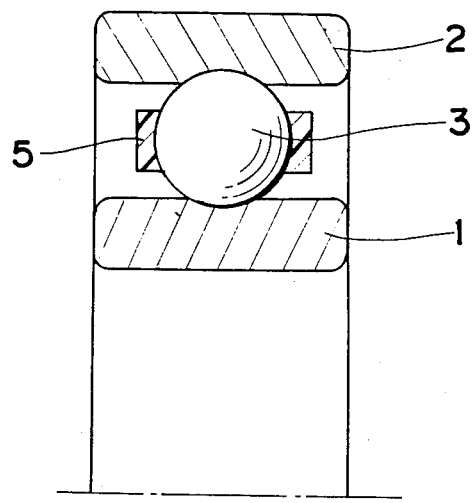
FIG. 9 is a sectional view of a prior art bearing.

FIG. 4 shows a sectional view of a ball bearing 20 as an example according to this embodiment. The structure of the ball bearing 20 is similar to that of the ball bearing 10 (See FIG. 1) according to the first embodiment, except that a cage 25 is formed of a metal such as stainless steel, or the like, and not of fluoroplastic. Hardness of metal inner and outer rings 21, 22 and of carbon balls 23 and the relation between the former and the latter in hardness are the same as those of the first embodiment. Accordingly, this ball bearing 20 can also bear high load and the balls 23 do not wear out easily.

After the inner and outer rings 21, 22, the balls 23 and the cage 25 are assembled into the ball bearing 20, the assembly 20 is treated with baking at a temperature higher than that at which the ball bearing 20 is to work.

The carbon balls 23 still contain a green carbon component after the calcination and also contain residual abrasive solution used in the abrasive process after assemblage, and such things cause the outgassing when these balls 23 are used in the high temperature conditions. This is why the baking treatment is carried out, that is, the application of the baking treatment aims at removing those outgas factors completely.

In this embodiment, the bearing 20 was baked at 300° C. for twenty hours, assuming that it would be used at a temperature of 200° C. After that, outgases of the ball bearing 20 of this embodiment and those of a conventional ball bearing which was different from the bearing 20 only in that it had not been baked were quantitatively determined using a gas chromatography. For this gas chromatography, a plurality of ball bearings according to this embodiment and a plurality of conventional ball bearings of the just above construction were prepared as samples and some of them were heated at a temperature of −150° C. and others 200° C. FIGS. 5 and 6 show examples of gas chromatograms for the conventional ball bearings heated at 150° C. and 200° C., respectively. Similarly, FIGS. 7 and 8 show gas chromatograms, corresponding to FIGS. 5 and 6, respectively, for the ball bearings of this embodiment. In those gas chromatograms, process of time, in other words, a change in mass number of gases detected by a detector of a gas chromatography apparatus (not shown) is represented by a horizontal axis, and detector response by a perpendicular axis. It must be noted that the projection appearing adjacent to the perpendicular axis in each of the chromatograms represents dirt attached to the sample bearings when a tester touched them, cleanser used before the gas chromatography to remove the dirt, and so on, which are substantially not gases out of the carbon balls. po As the gas chromatograms indicate clearly, large amounts of gases of different kinds were detected from the conventional ball bearings. These detected gases were mainly hydrocarbons containing thirteen to twenty three carbon atoms, and the total amount per bearing was 0.011 mg/g in case of the 150° C. heating and 0.035 mg/g in the case of the 200° C. heating. In contrast with the conventional ball bearings, the total amount of outgases detected from the baked ball bearings of this embodiment was 0.000 mg/g in both cases of 150° C. and 200° C. heating.

From these quantitative results, it has been confirmed that such ball bearings as treated in advance with baking at a temperature higher than a working temperature do not cause the outgassing. Accordingly, ball bearings of the present invention are reliable even when used in the high-temperature circumstances in the fields requiring high vacuum and cleanness. In fact, ball bearings according to the present embodiment have been working in a good condition for a long time, hardly causing the outgassing at portions to catch wafers of a sputtering apparatus, for example, where the temperature rises up to 400° C.

Furthermore, the ball bearings according to the present embodiment have proved their superior lubricating properties due to the carbon of the balls in spite that no lubricant is used. For example, ball bearings used for a wafer carrier and the like, in which such conditions that the number of revolutions is 1000 rpm, the atmospheric temperature is 150° C. and the pressure is $10^5$ torr to the atmospheric pressure are repeated, have been working for more than six months. As compared with this duration, a conventional ball bearing with its ball coated with Ag by an ion plating method had only about two weeks of lifetime.

This embodiment is not limited to ball bearings, but is also applicable to roller bearing. Moreover, this embodiment can be applied not only to radial bearings but also thrust bearings. In addition, the cage 25 is not essential.

In this embodiment, the temperature employed for the baking treatment was 300° C., though it is needless to say that the temperature for baking is not limited to 300° C. and should be changed according to a working temperature of the bearing.

As can be understood from the above description, since the rings are formed of metal and the rolling elements are formed of carbon having self-lubricating properties, according to this invention, the lubricating action between the rings and rolling elements is well performed, thereby reducing torque. In addition, since the rolling elements have hardness higher than the rings, wear-resisting properties are improved. Accordingly, the bearing can provide a long service life.

Furthermore, according to this invention, as a baking treatment at a temperature higher than a working temperature at which the bearing is to be used is applied to the rolling elements in advance of the actual service, outgas factors such as residual abrasive solution for carbon, a green carbon component, etc. are completely removed from the carbon balls through the evaporation. Therefore, the outgassing under the conditions of high vacuum and high temperature can be prevented easily and perfectly.

What is claimed is:

1. A method of producing a bearing comprising:
   assembling two rings formed of a metal, a plurality of rolling elements of calcined carbon having higher hardness than the metal, and a cage for retaining the plurality of carbon rolling elements into a bearing; and
   baking the bearing at a temperature higher than that at which the bearing is to be actually used.

2. A method of producing a bearing as claimed in claim 1, wherein said assembling step comprises:

assembling said rings and said rolling elements with a cage formed of a metal for retaining the plurality of rolling elements.

3. A method of producing a bearing as claimed in claim 12, wherein said assembling step comprises:
assembling said rings and said rolling elements with a cage formed of a fluoroplastic for retaining the plurality of rolling elements.

4. A method of producing a bearing comprising:
assembling two rings formed of a metal, and a plurality of rolling elements of calcined carbon having higher hardness than the metal into a bearing; and baking the bearing at a temperature higher than that at which the bearing is to be actually used.

* * * * *